(12) United States Patent
Abraham et al.

(10) Patent No.: US 9,191,266 B2
(45) Date of Patent: Nov. 17, 2015

(54) SYSTEM AND METHOD FOR STORING AND RETRIEVING CHANNEL DATA

(71) Applicant: Petrolink International, Douglas (IM)

(72) Inventors: Richard Abraham, Aberdeen (GB); Mark Patrick Farnan, Houston, TX (US)

(73) Assignee: Petrolink International, Douglas (IM)

( * ) Notice: Subject to any disclaimer, the term of this patent is extended or adjusted under 35 U.S.C. 154(b) by 264 days.

(21) Appl. No.: 13/829,590

(22) Filed: Mar. 14, 2013

(65) Prior Publication Data

US 2013/0254416 A1  Sep. 26, 2013

Related U.S. Application Data

(60) Provisional application No. 61/614,867, filed on Mar. 23, 2012.

(51) Int. Cl.
    *H04L 29/08* (2006.01)

(52) U.S. Cl.
    CPC .......... *H04L 29/08756* (2013.01); *H04L 67/12* (2013.01); *H04L 67/2823* (2013.01)

(58) Field of Classification Search
    CPC ................ H04L 67/2823; H04L 67/12; H04L 29/08756; H04L 29/08
    See application file for complete search history.

(56) References Cited

U.S. PATENT DOCUMENTS

| | | | |
|---|---|---|---|
| 7,054,750 B2 | 5/2006 | Rodney et al. | |
| 7,066,284 B2 | 6/2006 | Wylie et al. | |
| 7,142,986 B2 | 11/2006 | Moran | |
| 7,225,879 B2 | 6/2007 | Wylie et al. | |
| 7,341,117 B2 | 3/2008 | Wylie et al. | |
| 7,542,979 B2 | 6/2009 | Gupta et al. | |
| 7,571,777 B2 | 8/2009 | Wylie et al. | |
| 7,606,666 B2 | 10/2009 | Repin et al. | |
| 7,836,973 B2 | 11/2010 | Belcher et al. | |
| 7,980,312 B1 | 7/2011 | Hill et al. | |
| 8,011,446 B2 | 9/2011 | Wylie et al. | |
| 8,122,975 B2 | 2/2012 | Belcher et al. | |
| 2004/0149431 A1 | 8/2004 | Wylie et al. | |
| 2005/0063251 A1 | 3/2005 | Guidry et al. | |
| 2005/0197777 A1 | 9/2005 | Rodney et al. | |
| 2005/0241855 A1 | 11/2005 | Wylie et al. | |
| 2005/0267899 A1 | 12/2005 | Gupta et al. | |
| 2006/0173625 A1 | 8/2006 | Moran | |
| 2007/0047279 A1 | 3/2007 | Evans et al. | |
| 2007/0061081 A1 | 3/2007 | Moran | |
| 2007/0185696 A1 | 8/2007 | Moran et al. | |
| 2007/0187146 A1 | 8/2007 | Wylie et al. | |
| 2007/0284147 A1 | 12/2007 | Moran | |

(Continued)

OTHER PUBLICATIONS

U.S. Appl. No. 14/018,298, Bermudez Martinez.

(Continued)

*Primary Examiner* — Ebrahim Golabbakhsh
(74) *Attorney, Agent, or Firm* — Winstead PC

(57) ABSTRACT

In one embodiment, a method includes, for each of a plurality of channels at a well site, converting channel data from a source data format to a common data format in real-time as the channel data is generated. The common data format includes a plurality of elements organized into a plurality of sets. Each element includes a minimum collection of fields. The method further includes, for each of the plurality of channels, storing the converted channel data in a data store as part of the at least one element.

26 Claims, 3 Drawing Sheets

(56) References Cited

U.S. PATENT DOCUMENTS

| | | |
|---|---|---|
| 2008/0060846 A1 | 3/2008 | Belcher et al. |
| 2008/0087423 A1 | 4/2008 | Wylie et al. |
| 2008/0179094 A1 | 7/2008 | Repin et al. |
| 2008/0181230 A1 | 7/2008 | Hitt et al. |
| 2008/0184269 A1 | 7/2008 | Avery et al. |
| 2008/0208475 A1 | 8/2008 | Karr et al. |
| 2008/0262810 A1 | 10/2008 | Moran et al. |
| 2008/0294606 A1 | 11/2008 | Moran et al. |
| 2009/0090555 A1 | 4/2009 | Boone et al. |
| 2009/0132458 A1 | 5/2009 | Edwards et al. |
| 2009/0159336 A1 | 6/2009 | Boone |
| 2009/0182472 A1 | 7/2009 | Singh et al. |
| 2009/0234584 A1 | 9/2009 | Casey et al. |
| 2009/0254569 A1 | 10/2009 | Paulk et al. |
| 2009/0308616 A1 | 12/2009 | Wylie et al. |
| 2010/0005111 A1 | 1/2010 | Bal et al. |
| 2010/0179963 A1 | 7/2010 | Conner et al. |
| 2010/0191511 A1 | 7/2010 | Hsu et al. |
| 2010/0204972 A1 | 8/2010 | Hsu et al. |
| 2010/0217530 A1 | 8/2010 | Boone |
| 2010/0259415 A1 | 10/2010 | Strachan et al. |
| 2011/0106856 A2 | 5/2011 | Mr. Paulk et al. |
| 2011/0114387 A1 | 5/2011 | Belcher et al. |
| 2011/0166843 A1 | 7/2011 | Hsu et al. |
| 2011/0170373 A1 | 7/2011 | Hsu et al. |
| 2011/0174541 A1 | 7/2011 | Strachan et al. |

OTHER PUBLICATIONS

U.S. Appl. No. 13/919,240, Bermudez Martinez et al.

Halliburton / Landmark Software & Services, "Drillworks® User Guide", Oct. 2009.

Martínez, R.B., Petrolink Services, Inc., and Olán, C.I., Petrolink Services, Inc., "Improving Real-Time Drilling Optimization Applying Engineering Performance From Offset Wells." SPWLA 53rd Annual Logging Symposium, Jun. 16-20, 2012.

Khudiri, M.M. And Shehry, M.A., Saudi Aramco, and Curtis, J.D., Petrolink International, "Data Architecture of Real-Time Drilling and Completions Information at Saudi Aramco;" SPE 116848, 2008 SPE Russian Oil & Gas Technical Conference and Exhibition, Moscow, Russia, Oct. 28-30, 2008.

Pérez-Téllez, C., Rodríguez, R., and Ramírez, I., PEMEX Drilling Business Unit, and Bermúdez-Martinez, R.A., and Palavicini-Cham, C.A., Petrolink Services Inc., "Applying a Real-Time Engineering Methodology to Drill Ahead of Potential Undesirable Events;" OTC 23180, Offshore Technology Conference, Houston, Texas, USA, Apr. 30-May 3, 2012.

US 9,191,266 B2

SYSTEM AND METHOD FOR STORING AND RETRIEVING CHANNEL DATA

CROSS-REFERENCE TO RELATED APPLICATIONS

This patent application claims priority from, and incorporates by reference the entire disclosure of, U.S. Provisional Patent Application No. 61/614,867 filed on Mar. 23, 2012.

BACKGROUND

1. Technical Field

The present invention relates generally to data storage and more particularly, but not by way of limitation, to systems and methods for storing and retrieving channel data.

2. History of Related Art

An oil well is a general term for any boring through the earth's surface that is designed to find petroleum-oil hydrocarbons. An initial life of an oil well can be viewed in three stages: planning, drilling, and completion. During these stages, a huge volume of information is generated. This information can be loosely categorized into two types: static data and real-time data. Static data is generated either in advance (e.g., modeling data, cost predictions, and well plans) or after events (e.g., daily reports, mud reports, fracture reports, and casing data). Static data can be delivered either on a regular basis (e.g. daily reports) or on a per-event basis (e.g., fracture reports and completion reports). Real-time data is sensor-derived data that is generated through either analysis of fluids (e.g., mud logs) or through deploying sensor tools in a well hole. Real-time data can be collected immediately via, for example, telemetry, or upon completion of a tool run (e.g., memory data). Real-time data can be, for example, time-indexed or depth-indexed During the drilling and completion stages, there has been increased focus on remote support and participation. In particular, there is significant value to be obtained from an ability to analyze in real time various data streams that are generated, often through cross-comparison with data from previous wells or with models from the planning stage. A typical oil well can require collaboration from teams based at the oil well, in regional offices, and corporate headquarters. This may mean that people thousands of miles apart need to be sure they are looking at the same data sets. These data sets, in turn, may be aggregated from several different streams of data, from historical data generated in previous wells, or from models predicted during the planning stage.

Benefits can be gained from cross-correlation and analysis of this data. These benefits can include greater value in terms of accuracy of interpretation and lessons learned for future reference. Examples are comparing real-time mud and pressure readings with loss-of-time incidents reported in daily operations reports and analyzing cost information against drilling-performance indicators. Benefits can also be gained by allowing people from different disciplines and sited in different locations to work together around the same data and information so as to provide a holistic approach to data that enables better informed decisions.

Historically this has not been possible due to schisms in the organization of data and the difficulty of sharing many different types of data in the time constraints required for real-time analysis across multiple locations. Further complications have been generated by the requirement to tightly control access to this data to ensure security for what can be extremely valuable information that can have significant market impact upon an oil company.

SUMMARY OF THE INVENTION

In one embodiment, a method includes, for each of a plurality of channels at a well site, on at least one server computer, converting channel data from a source data format to a common data format in real-time as the channel data is generated. The common data format includes a plurality of elements organized into a plurality of sets. Each element includes a minimum collection of fields. The method further includes, for each of the plurality of channels, the at least one server computer storing the converted channel data in a data store as part of the at least one element.

In one embodiment, a system includes at least one server computer, wherein the at least one server computer is operable to perform a method. The method includes, for each of a plurality of channels at a well site, converting channel data from a source data format to a common data format in real-time as the channel data is generated. The common data format includes a plurality of elements organized into a plurality of sets. Each element includes a minimum collection of fields. The method further includes, for each of the plurality of channels, storing the converted channel data in a data store as part of the at least one element.

In one embodiment, a computer-program product includes a computer-usable medium having computer-readable program code embodied therein. The computer-readable program code is adapted to be executed to implement a method. The method includes, for each of a plurality of channels at a well site, converting channel data from a source data format to a common data format in real-time as the channel data is generated. The common data format includes a plurality of elements organized into a plurality of sets. Each element includes a minimum collection of fields. The method further includes, for each of the plurality of channels, storing the converted channel data in a data store as part of the at least one element.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

Various embodiments utilize a database system that implements a common data format; also referred to herein as a "common data set." In the drilling industry, data is generated from numerous sensors that transmit data using diverse industry data formats such as, for example, WITSML, Professional Petroleum Data Management (PPDM) standards, and numerous others. A given sensor or other source of data is referred to herein as a "channel." Data from a channel may be referred to as "channel data," which term is inclusive of both raw data and metadata. The raw data includes, for example, measured data determined by the sensor or source. The metadata includes information about the raw data such as, for example, time, depth, identification information for the channel, and the like. In a typical embodiment, principles of Eulerian set theory are applied to meaningfully and uniformly represent data that is received in the diverse data formats.

Figure 1:
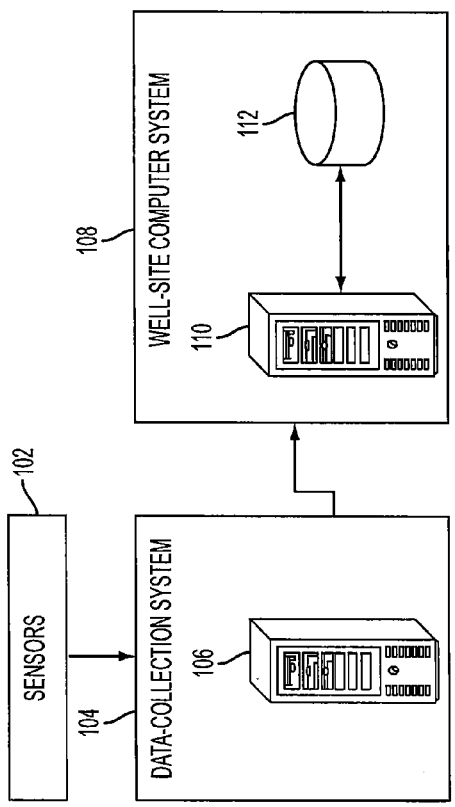
FIG. 1 illustrates system for real-time conversion and retrieval of channel data.

FIG. 1 illustrates system 100 for real-time conversion and retrieval of channel data. In a typical embodiment, the system 100 is situated at a well site. The system 100 includes sensors 102, a data-collection system 104, and a well-site computer system 108. The data-collection system 104 includes at least one server computer 106. The well-site computer system 108 includes at least one server computer 110 and a data store 112.

The data-collection system 104 receives channel data from the sensors 102. The sensors 102 can provide various types of channel data such as, for example, mud logging, logging while drilling (LWD), wireline data, production data, and the like. The channel data can be transmitted to the at least one server computer 106 via, for example, TCP/IP or RS232 (i.e. serial port) connections. In embodiments using serial-port connections, communication can occur through a local COM port with a null modem cable. For distances exceeding a maximum serial cable length limitation, a serial-to-Ethernet converter may be used. In embodiments utilizing TCP/IP connections, the data-collection system 104 can be configured as a server or client and collect the channel data through an agreed-upon IP socket. TCP/IP network connections can have firewall technology implemented as needed to support security policies.

In various embodiments, the data-collection system 104 can be situated in different locations at the well site. For example, the data-collection system 104 can be in an employee's office, in a communications room, or in a service-company's cabin. As described in greater detail with respect to FIG. 2, the well-site computer system 108 receives the channel data from the data-collection system 104 and stores the channel data on the data store 112 in a common data format.

In various embodiments, all or a portion of the sensors 102 may be provided and maintained by third-party service companies. In these embodiments, each service company typically supplies details of the channel, data including, for example, what data is transmitted and a unit of measurement for data values. Therefore, upon initial configuration of a channel (i.e., one of the sensors 102), certain information is known, such as, for example, a well to which the channel relates, data points that are transferred on the channel, a source data format (e.g., WITSML), etc. As a result of this information, a precise type and format of data and metadata that will be transmitted via the channel are known. As described in greater detail below with respect to FIG. 3, this information allows the channel data to be mapped and converted into a standardized XML-based format that conforms to the common data format. This standardized XML-based format is then transmitted to the at least one server computer 110 and stored in the data store 112 in real-time.

In a typical embodiment, the common data format is represented in the data store 112. The data store 112 may be, for example, a relational database using SQL Server or Oracle. The common data format defines each type of information that is received via the sensors 102 and establishes a minimum collection of data fields and metadata fields that are stored for that type. For example, in a typical embodiment, each type of information may be defined as a type of object, with the minimum collection of data being defined as properties for the object.

To give meaning to the stored channel data, the common data format utilizes a set structure that includes elements and sets. By way of example, in various embodiments, there can be a one-to-one correspondence between "elements" and "channels"; however, it should be appreciated that elements can be defined differently to include, for example, groups of channel data (e.g., corresponding to a well) or selected channel data from a given channel. Elements can be represented as a table or group of tables that incrementally become larger as new channel data is received.

In a typical embodiment, sets can be represented hierarchically in the data store 112 using the channel data. In particular, sets can be represented as object types that advantageously aggregate particular groups of elements and/or other objects. For example, a "well bore" set can aggregate elements that are applicable to well bores. Thus, instances of the "well bore" object type can include specific elements and/or objects that are applicable to specific well bores along with, for example, identification properties for the well bore. From a hierarchical view, additional object types can be defined to represent sets such as, for example, wells. Instances of a well object type can include, for example, specific well-bore objects that are applicable to a specific well along with, for example, identification information for the well. Sets can similarly be defined for a field, project, and the like. It should also be appreciated that sets can overlap. For example, depending on purpose, wells may be grouped by geography, production, or arbitrary criteria. In this manner, sets can also be custom defined by users to suit particular needs. Although particular elements may be included within multiple sets according to the set structure, typically only one copy of each element stored.

Figure 2:
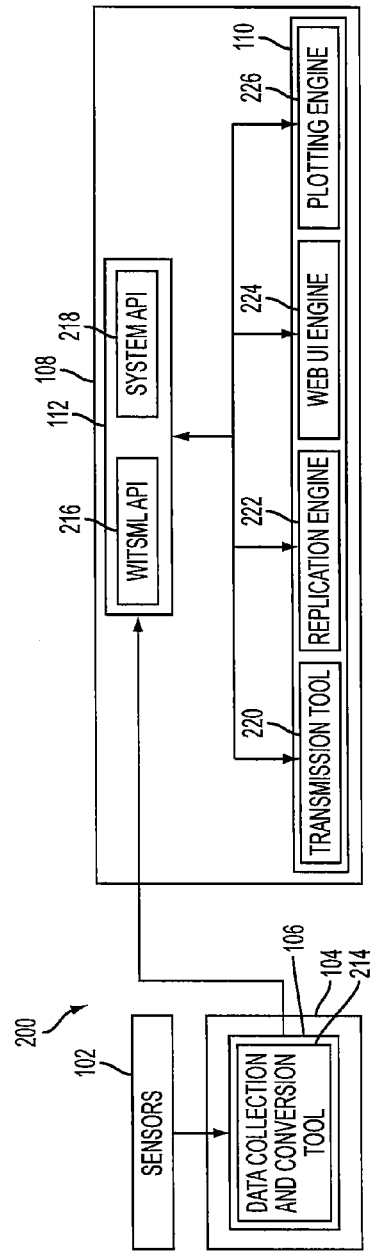
FIG. 2 illustrates a component view of the system of FIG. 1.

FIG. 2 illustrates a component view 200 of the system 100. As shown, the data-collection system 104 includes a data collection and conversion tool 214 resident on the at least one server computer 106. The at least one server computer 110 includes a transmission tool 220, a replication engine 222, a web user-interface (UI) engine 224, and a plotting engine 226. In a typical embodiment, the transmission tool 220, the replication engine 222, the web UI engine 224, and the plotting engine 226 are each software components of the at least one server computer 110. In addition, the data store 112 is operable to receive and provide channel data according to a WITSML API 216 and/or a system API 218.

In a typical embodiment, the WITSML API 216 is representative of an ability to transmit and receive data according to an industry data format. Therefore, in other embodiments, the WITSML API 216 could be substituted or supplemented with an API for a different industry data format. APIs such as, for example, the WITSML API 216, can be used to transmit or receive data to or from, respectively, third-party software applications. In a typical embodiment, the system API 218 is operable to receive and provide channel data according to the common data format as described above. In a typical embodiment, the data store 112 supports all vendor extensions and is capable of handling non-standard implementations. Third party applications may connect to the well-site computer system 108 for purposes of updating real-time analyses.

In a typical embodiment, if the data store 112 receives data via the WITSML API 216, the data is converted into the common data format in a manner similar to that described with respect to the data collection and conversion tool 214 below. If attachment data is received via the system API 218, in a typical embodiment, the attachment data will be first stored as an internal attachment. Subsequently, the data store 112 typically checks to see if it has any mapping records for that particular attachment type, checking by format. Mapping records will be described in greater detail with respect to FIG. 3.

In a typical embodiment, as described above, channel data, either static or real-time, is stored as discrete objects represented by elements. The elements may then be stored in a Eulerian set structure as described above with respect to the common data format. Homogeneity of data objects with different indexing can be achieved through the use of calculated interstitial data sets to allow comparison. For instance, data received with indexing based upon time is converted into an interstices set with extrapolated depth-based data indexing. In other words, data may be indexed based on two values: depth and time. An example will be described with respect to FIG. 3.

The transmission tool 220 is operable to transmit data (e.g. as XML) between data stores such as, for example, the data store 112 and another data store that is configured similarly to the data store 112 (e.g., a central data store). In a typical embodiment, the transmission tool 220 supports multiple vendor extensions and is capable of handling non-standard implementations. For example, in various embodiments, the transmission tool 220 allows data transport between data stores such as, for example, the data store 112, via an XML data stream.

The replication engine 222 typically utilizes the system API 218 and allows for synchronization through bidirectional exchange of any type of data or metadata within the data store 112. In various embodiments, data within data sets of the common data format can be viewed as unique elements that belong to one or more sets. Each element and set has a unique ID (UNID) and an access-control list. Replication between servers may occur at intervals according to a defined schedule, in near-real-time when triggered by data changes in server clusters, or when triggered by an administrator or program.

In a typical embodiment, the replication engine 222 has network access to a target server that may be similar, for example, to the at least one server computer 110. Once replication is initiated, the replication engine 222 contacts the target server. Authentication can be performed using, for example, secure authentication markup language (SAML). Once authentication is complete, the replication engine 222 downloads lists from both the at least one server computer 110 and the target server of all data and metadata that has changed since a last logged replication. In a typical embodiment, a last entry of each list is a timestamp to use as a query marker for a next replication event. The replication engine 222 then cross-compares the lists, using rule-based logic, to handle any conflicts where elements have changed on both systems.

The replication engine 222 moves through the lists (typically indexed by UNID) and cross-compares each UNID. If a UNID exists on one server only (i.e., the target server or the at least one server computer 110 but not both), the element or set to which the UNID corresponds is transmitted to the other server. If a UNID appears on both lists, then there is typically a replication conflict, and rules for handling this conflict are generally followed. In a typical embodiment, these rules allow the replication engine 222 to determine which modified version is the one that should overwrite the other. Rules include, for example, first modified, last modified, server X always wins, etc. In various embodiments, the replication engine 222 can also be configured to perform single-direction replication. In these embodiments, a single server (e.g., the target server) is queried for changes since last replication. These changes are all transmitted to the target server.

The web UI engine 224 provides user management, navigation and, for example, a static data interface. The web UI engine 224 can be used, for example, to access the system API 218 via the static data interface. The plotting engine 226 allows presentation and display of channel data from the data store 112. For example, the plotting engine 226 can allow a user to securely access the channel data via a web browser. Displays provided by the plotting engine 226 can include, for example, plots, graphs, status indicators, and digital and analog gauges with thresholds.

The data collection and conversion tool 214 can receive the channel data from the sensors 102 in numerous industry data formats (e.g., WITSML, log interchange standard (lis), log ASCII standard (las)) and convert into a standardized XML-based format that conforms to the common data format. Exemplary operation of the data collection and conversion tool 214 will be described in greater detail with respect to FIG. 3.

Figure 3:
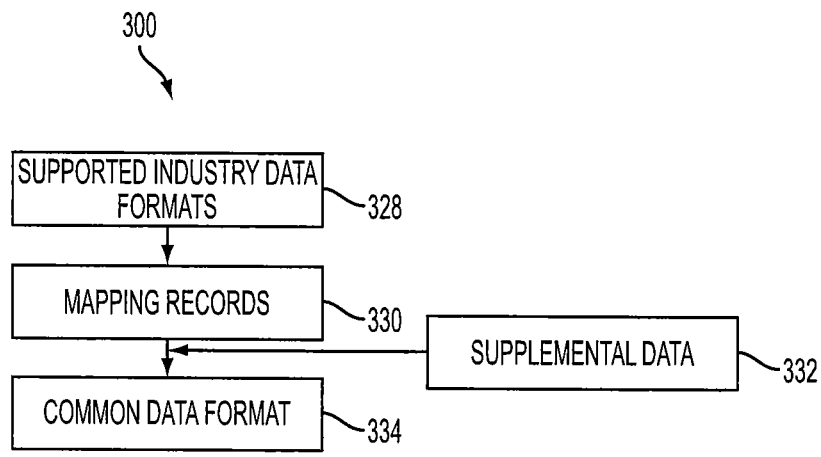
FIG. 3 illustrates an exemplary conversion process.

FIG. 3 illustrates an exemplary conversion process 300 that may be performed by a data collection and conversion tool such as, for example, the data collection and conversion tool 214 of FIG. 2. The conversion process 300 converts supported industry data formats 328 into a common data format 334.

Upon initial configuration of a channel, certain information is known such as, for example, a well to which the channel relates, data points that are transferred on the channel, a source data format (e.g., WITSML), etc. As a result of this information, a precise type and format of data and metadata that will be transmitted via the supported industry data formats 328 is known. Mapping records 330, usually stored as metadata, are defined that map fields of each of the supported industry data formats 328 (e.g., WITSML) to fields of an object type defined by the common data format 334.

Since the supported industry data formats 328 can vary significantly in format and information provided, the mapping records 330 typically include a distinct mapping record for each industry data format of the supported industry data formats 328. If an applicable mapping record does not yet exist, the applicable mapping record can be generated in this fashion and stored among the mapping records 330. When channel data is received in real time according to the supported industry data formats 328, the channel data is mapped according to the mapping records 330 into an object and, more particularly, into an element, of the common data format 334. In that way, the channel data is stored not according to the supported industry data formats 328 but in the common data format 334 according to a type of information contained therein.

As a general matter, the supported industry data formats 328 may not provide all data that is minimally required by the common data format 334. In a similar manner, the supported industry data formats 328 may provide additional data that is not required by the common data format 334. The data collection and conversion tool is operable to handle these non-mutually exclusive scenarios. More particularly, if any of the supported industry data formats 328 provides less than all data minimally required by the common data format 334, a source for supplemental data 332 can be specified, for example, as a rule. Depending on its nature, the supplemental data 332 may be, for example, calculated, acquired from another source such as a database, or manually entered by personnel. If any of the supported industry data formats 328 provide additional data that is not required by the common data format 334, the additional data may be stored and associated with the applicable object.

An example of the supplemental data 332 will now be described. In various embodiments, the common data format 334 facilitates multiple indexing based on, for example, time, measured depth, and vertical depth. It should be appreciated that the supported industry data formats 328 may not include sufficient information to index based on time, measured depth, and vertical depth. Rather, channel data received in the supported industry data formats 328 is often only received with sufficient data to index, for example, based on either time or one of measured depth and vertical depth. In various embodiments, the supplemental data 332 can provide missing time or depth data.

In particular, a given industry data format of the supported industry data formats 328 may not provide a measured depth or a vertical depth as part of its metadata. Therefore, in a typical embodiment, upon configuration of a channel, a source for the supplemental data 332 (in particular, supplemental data that includes depth information) can be defined. For example, it may be known that sensors corresponding to other channels are positioned at a same depth as the sensor for the given channel. If any of these other channels provide measured or vertical depth data as part of their channel data, these channels can be cross-referenced. The most recent channel data for one of these channels can be used as a source for the supplemental data 332. This relationship can be specified, for example, as a rule. Thus, once the channel is configured and the channel data is being received, the supplemental data 332 can be supplied during real-time conversion into the common data format.

Figure 4:
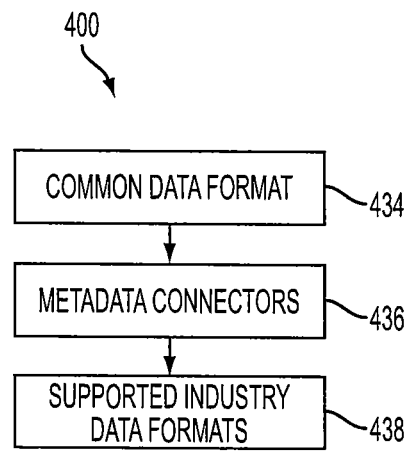
FIG. 4 describes an example of converting data from a common data format into supported industry data formats.

FIG. 4 describes an example 400 of converting data from a common data format 434 into supported industry data formats 438. The supported industry data formats 438 may be, for example, similar to the supported industry data formats 328 of FIG. 3. As shown, metadata connectors 436 can be established that define relationships between each object representation in the common data format 434 (inclusive of both elements and sets) and each of the supported industry data formats 438. In that way, a particular set can be converted into taxonomies of the supported industry data formats 438. The metadata connectors 436 may be similar to the mapping records 330 described with respect FIG. 3 except that the metadata connectors 436 are utilized in reverse fashion.

For example, to the extent a well set has a mappable equivalent representation in a given industry data format of the supported industry data formats 438, this mappable equivalent can be used. Even sets custom-defined by users, as aggregations of objects defined by the common data format, can be output to the supported industry data formats 438 as a result of the metadata connectors 436 defined for the aggregated sets/objects. Therefore, based on the metadata connectors 436, instances of each object type (e.g., elements and sets) automatically have a defined relationship with each of the supported industry data formats 438.

As a result of the principles described above with respect to FIGS. 3 and 4, a common data format such as, for example, the common data format 334 the common data format 434, greatly reduces the complexity of working with data in the drilling industry. For example, web or client applications that display or report on for example, real-time data, need not adapt to or be able to interpret other industry data formats. Such web or client applications only need to be able to interact via the common data format and are thus abstracted from the complexities of working with diverse industry data formats. As new data formats are supported by the common data format, operation of these web or client applications can remain unchanged. In addition, because of the common data format, any supported industry data format can be converted to any other supported industry data format without a need to define innumerable direct mappings and conversions. Rather, when a new industry data format is supported, conversion only needs to be accomplished to the common data format in a manner similar to that described with respect to FIG. 3. After conversion into the common data format, data such as channel data can be converted to any supported industry data formats as described with respect to FIG. 4.

Figure 5:
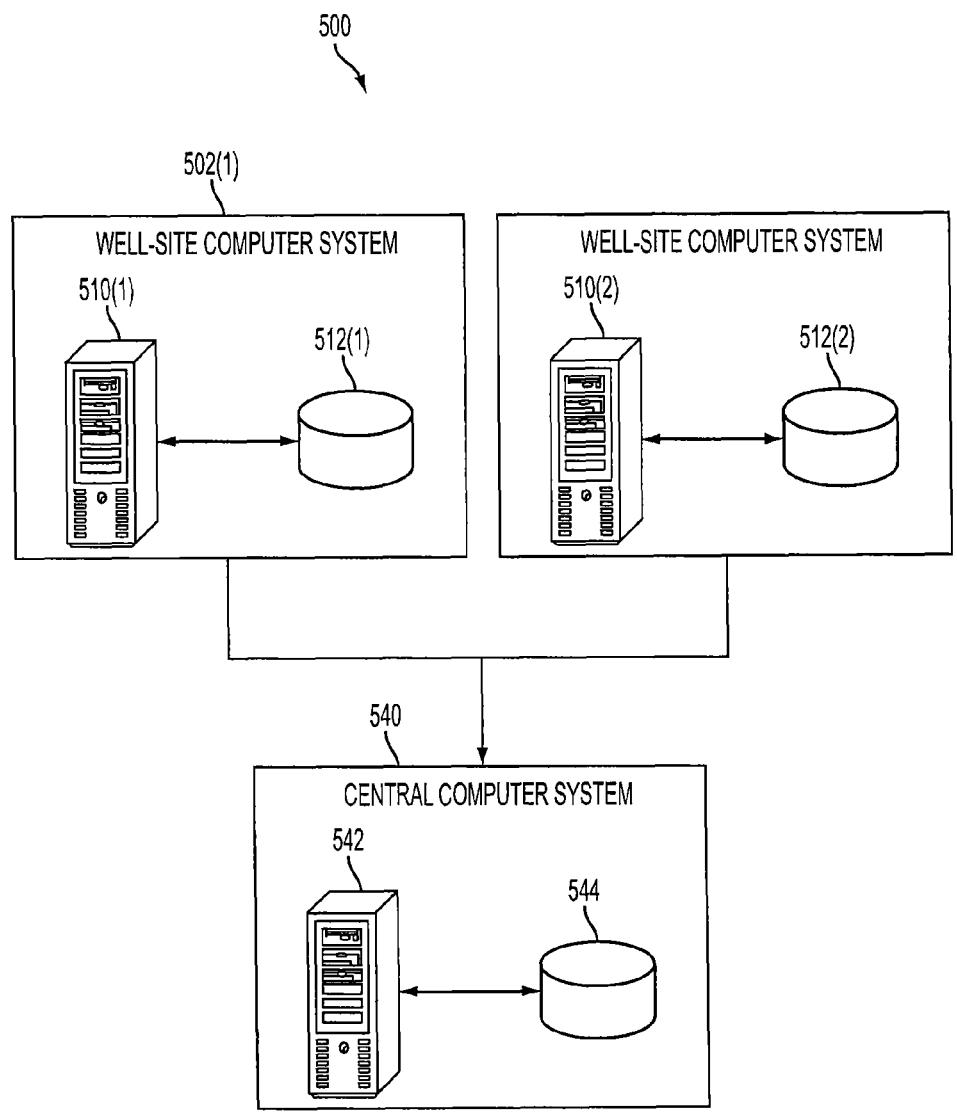
FIG. 5 illustrates system for storing and retrieving channel data.

FIG. 5 illustrates system 500 for storing and retrieving channel data. The system 500 includes a well-site computer system 502(1), a well-site computer system 502(2), and a central computer system 540. It should be appreciated that the well-site computer system 502(1) and the well-site computer system 502(2) are shown for illustrative purposes. In practice, the central computer system 540 may communicate with any number of well-site computer systems such as, for example, the well-site computer system 502(1) and the well-site computer system 502(2).

The well-site computer system 502(1) and the well-site computer system 502(2) include at least one server computer 510(1) and at least one server computer 510(2), respectively. In addition, the well-site computer system 502(1) and the well-site computer system 502(2) include a data store 512(1) and a data store 512(2), respectively. In a typical embodiment, the well-site computer system 502(1) and the well-site computer system 502(2) operate as described with respect to the well-site computer system 108 of FIG. 1. The central computer system includes at least one server computer 542 and a central data store 544.

In a typical embodiment, the well-site computer system 502(1) and the well-site computer system 502(2) are operable to communicate with the central computer system 540 via a transmission tool such as, for example, the transmission tool 220 of FIG. 2. In various embodiments, the well-site computer system 502(1) and the well-site computer system 502(2) may communicate via, for example, satellite communication or other network communication. In this fashion, the central computer system 540 is operable to store, in real-time, channel data related to multiple wells in the central data store 544 according to a common data format as described above. In addition, the central computer system 540 is operable to provide the channel data to requestors in real-time in the common data format or in any supported industry data format.

In a typical embodiment, the data store 512(1) and the data store 512(2) can act as a buffer at respective well sites in the event a communications link is lost, for example, to the central computer system 540. In a typical embodiment, this functionality also enables personnel at each well site to access and view the same data being monitored at the central computer system 540 without having to utilize, for example, a satellite connection. In a typical embodiment, the data store 512(1) and the data store 512(2) can be synchronized with the central data store via, for example, the transmission tool as described above. In this fashion, the central data store can act as a central hub for the consolidation of data from multiple satellite data stores such as, for example, the data store 512(1) and the data store 512(2). Third-party applications may connect to either central computer system 540 or appropriate one of the well-site computer system 502(1) and the well-site computer system 502(2). In this fashion, the third-party applications can update real-time analyses provided thereby.

In various embodiments, storage according to the common data format can be made faster and more efficient by advantageously leveraging how relational databases access and store tables. In a typical embodiment, each element in the common data format can be stored in logs. It should be appreciated that database systems that operate using, for example, SQL Server or Oracle, generally store recently-accessed tables and associated indices in cache memory for faster access. Indices and tables that are not utilized within certain periods of time are removed from the cache memory. In various embodiments, this functionality can be leveraged to ensure that indices and tables relating, for example, to wells that are considered "active," are stored in the cache memory. In general, it is commonplace for logs to be stored in a small number of tables that can become enormous in storage size over time. This can make the cache memory inefficient and cause a database system to operate slowly and less efficiently. This is due, in part, to the fact that the grouping of data amongst the tables does not reflect how data is currently being accessed and, therefore, the cache memory does not necessarily include tables that are likely to be accessed in the near future.

In a typical embodiment, each log can represent an element of the common data format and be stored in a separate database table (although other groupings are also possible and will be apparent to one of skill in the art after reviewing the description herein). Under this grouping, each log can represent, for example, a particular channel. When channel data is being received, that channel data is stored in the log. The corresponding database table and its index will therefore remain in the cache memory.

Collectively, indices for logs (and the logs themselves) that are actively receiving incoming channel data will remain in the cache memory. Because of the storage of logs in separate database tables, channel data is not comingled with other channel data that may not be active. Therefore, the database tables that remain in the cache memory are likely to be those that correspond to active channels, and therefore, active wellbores and wells. In addition, it is these database tables that are likely to be accessed in the near future, thereby making the cache memory more efficient. Channels that are not actively providing channel data are less likely to have their logs included in the cache memory. These channels are generally channels that refer to inactive sensors (and wells) and are therefore less likely to be accessed in the near future.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
for each channel of a plurality of channels, at a well site of a plurality of well sites, at least one server computer collecting channel data from the channel in real-time as the channel data is generated by the channel;
for each channel of the plurality of channels, the at least one server computer converting the channel data from a source data format to a common data format in real-time as the channel data is collected;
wherein the common data format comprises a plurality of elements organized into a plurality of sets, each element comprising a minimum collection of fields that defines a type of information;
wherein each set of the plurality of sets aggregates elements of the plurality of elements;
wherein, for each channel of the plurality of channels, the converting comprises mapping one or more data points of the channel data to one or more fields of the minimum collection of at least one element of the plurality of elements;
for each channel of the plurality of channels, in real-time as the channel data is converted, the at least one server computer:
storing the converted channel data in at least one data store, at the well site, that is configured according to the common data format, wherein the converted channel data is stored in the at least one data store as part of the at least one element;
transmitting the converted channel data to a central data store, not located at the well site, that is configured according to the common data format, wherein the converted channel data is stored in the central data store as part of the at least one element; and
wherein the at least one data store and the central data store make the converted channel data accessible to requestors in real-time as the at least one data store and the central data store, respectively, are updated.

2. The method of claim 1, wherein the converting utilizes a metadata connector that defines a relationship between the source data format and the common data format.

3. The method of claim 1, wherein the converting comprises, responsive to the channel data lacking at least one field of the minimum collection, acquiring supplemental data corresponding to the at least one field.

4. The method of claim 3, wherein the acquiring comprises mapping the at least one field to data provided via another channel.

5. The method of claim 1, wherein at least one set of the plurality of sets aggregates other sets of the plurality of sets.

6. The method of claim 1, wherein the plurality of sets comprises:
a well-bore set comprising elements relating to a given well bore; and
a well set comprising well-bore sets relating to a given well.

7. The method of claim 1, comprising custom-defining a new set to be included in the plurality of sets.

8. The method of claim 1, wherein the common data format facilitates multiple indexing of the converted channel data based on multiple data fields.

9. The method of claim 8, wherein the multiple data fields are selected from the group consisting of: time, measured depth, and vertical depth.

10. The method of claim 8, wherein the converting comprises, responsive to the channel data lacking information sufficient to index based on at least one data field of the multiple data fields, acquiring supplemental data corresponding to the at least one data field.

11. The method of claim 1, comprising:
responsive to the storing, accessing one or more sets from the data store; and
updating a real-time analysis based on the one or more sets.

12. The method of claim 1, comprising:
accessing one or more sets from the at least one data store; and
converting the one or more sets to a supported industry data format, the converting yielding destination data.

13. The method of claim 12, comprising:
wherein the accessing and converting is performed responsive to the storing; and
transmitting the destination data to a third-party application so that a real-time analysis can be updated.

14. The method of claim 13, wherein converting the one or more sets comprises utilizing a mapping record to map fields of the one or more sets to fields of the supported industry data format.

15. The method of claim 1, wherein, responsive to the channel data including additional data not required by the minimum collection, the storing comprises storing the additional data and associating the additional data with the at least one element.

16. The method of claim 1, wherein at least a portion of the plurality of sets comprise overlapping elements of the plurality elements.

17. The method of claim 1, comprising:
converting static data relating to the well site to the common data format; and
storing the converted static data in the at least one data store.

18. The method of claim 1, comprising synchronizing the at least one data store with another data store.

19. The method of claim 1, wherein the plurality of channels utilizes a plurality of source data formats.

20. The method of claim 19, wherein the plurality of source data formats are selected from the group consisting of: WITSML, log interchange standard, and log ASCII standard.

21. The method of claim 1, wherein, for each element of the plurality of elements, the minimum collection comprises at least one data field and at least one metadata field.

22. The method of claim 1, wherein the at least one data store stores each element of the plurality of elements as a separate log in a relational database.

23. The method of claim 1, wherein the converting and the storing are performed for each of a plurality of well sites.

24. The method of claim 1, comprising transmitting the converted channel data to a central computer system in real-time.

25. A system comprising:
at least one server computer comprising computer hardware, wherein the at least one server computer is operable to perform a method comprising:
for each channel of a plurality of channels, at a well site of a plurality of well sites, collecting channel data from the channel in real-time as the channel data is generated by the channel;
for each channel of the plurality of channels, converting the channel data from a source data format to a common data format in real-time as the channel data is collected;
wherein the common data format comprises a plurality of elements organized into a plurality of sets, each element comprising a minimum collection of fields that defines a type of information;
wherein each set of the plurality of sets aggregates elements of the plurality of elements;
wherein, for each channel of the plurality of channels, the converting comprises mapping one or more data points of the channel data to one or more fields of the minimum collection of at least one element of the plurality of elements;
for each channel of the plurality of channels, in real-time as the channel data is converted:
storing the converted channel data in at least one data store, at the well site, that is configured according to the common data format, wherein the converted channel data is stored in the at least one data store as part of the at least one element;
transmitting the converted channel data to a central data store, not located at the well site, that is configured according to the common data format, wherein the converted channel data is stored in the central data store as part of the at least one element; and
wherein the at least one data store and the central data store make the converted channel data accessible to requestors in real-time as the at least one data store and the central data store, respectively, are updated.

26. A computer-program product comprising a non-transitory computer-usable medium having computer-readable program code embodied therein, the computer-readable program code adapted to be executed to implement a method comprising:
for each channel of a plurality of channels, at a well site of a plurality of well sites, collecting channel data from the channel in real-time as the channel data is generated by the channel;
for each channel of the plurality of channels, converting the channel data from a source data format to a common data format in real-time as the channel data is collected;
wherein the common data format comprises a plurality of elements organized into a plurality of sets, each element comprising a minimum collection of fields that defines a type of information;
wherein each set of the plurality of sets aggregates elements of the plurality of elements;
wherein, for each channel of the plurality of channels, the converting comprises mapping one or more data points of the channel data to one or more fields of the minimum collection of at least one element of the plurality of elements;
for each channel of the plurality of channels, in real-time as the channel data is converted:
storing the converted channel data in at least one data store, at the well site, that is configured according to the common data format, wherein the converted channel data is stored in the at least one data store as part of the at least one element;
transmitting the converted channel data to a central data store, not located at the well site, that is configured according to the common data format, wherein the converted channel data is stored in the central data store as part of the at least one element; and
wherein the at least one data store and the central data store make the converted channel data accessible to requestors in real-time as the at least one data store and the central data store, respectively, are updated.

\* \* \* \* \*